Oct. 27, 1931.     R. FISHER     1,828,928
AERIAL DELIVERY DEVICE
Filed Dec. 11, 1929
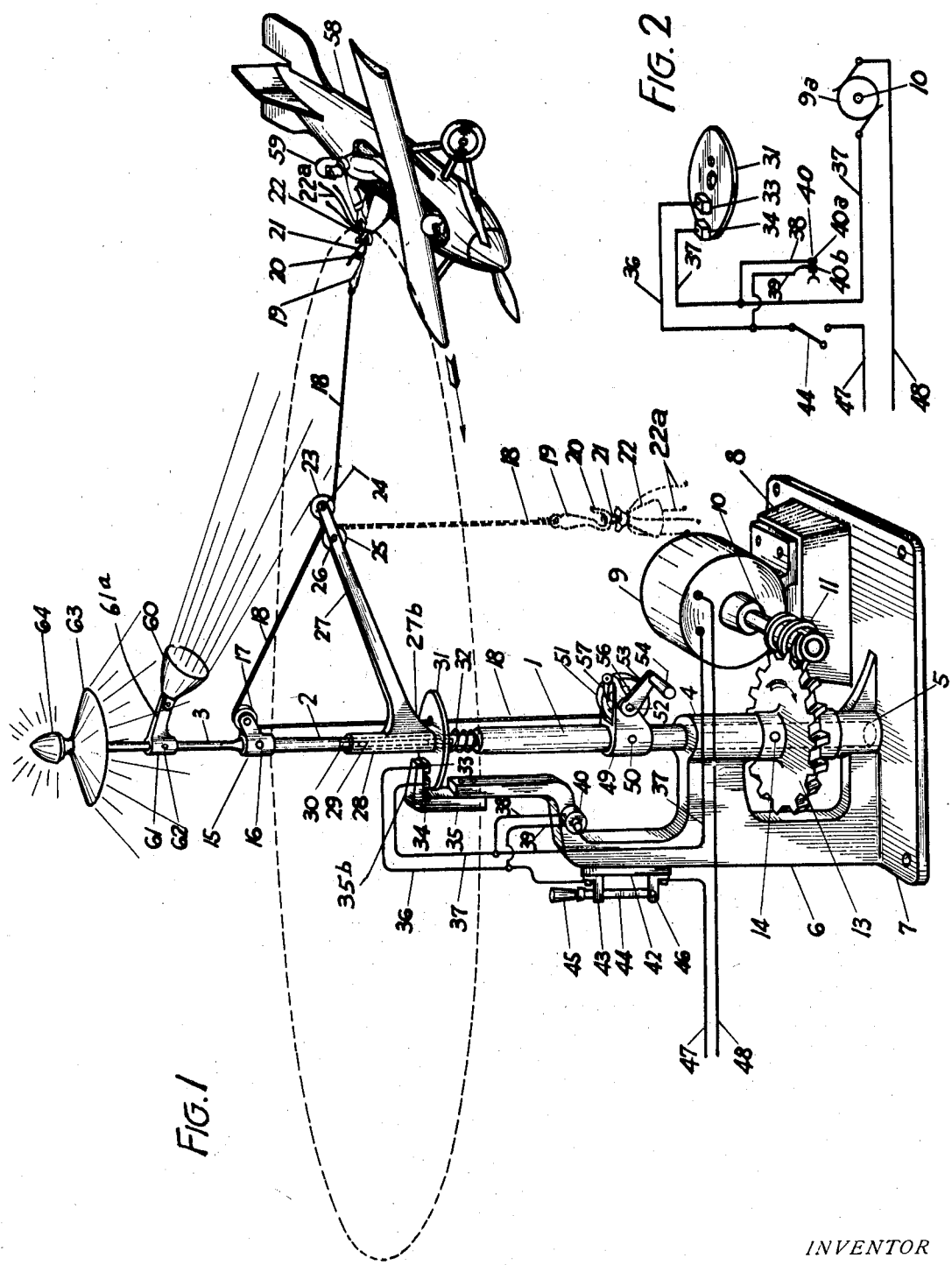
INVENTOR
Roy Fisher
BY Raymond L. Barton
ATTORNEY Patented Oct. 27, 1931

1,828,928

UNITED STATES PATENT OFFICE

ROY FISHER, OF MONTEBELLO, CALIFORNIA

AERIAL DELIVERY DEVICE

Application filed December 11, 1929. Serial No. 413,302.

In this specification, and the accompanying drawings, I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My improved invention relates to devices which co-operate with aircraft whereby various articles especially air mail, may be picked up while the craft is on the wing.

It is an object to broadly cover means whereby a flying aircraft, by varying its speed, may adapt its movement in synchrony with the movement of the article to be picked up so that a delivery or an exchange may be made with convenience and ease without the use of auxiliary devices attached to the flying aircraft.

Numerous other objects may be obvious, but the fundamental principle outlined will serve for the purpose of disclosure.

The aerial delivery device will be disclosed as moving in an orbital path struck from a perpendicular axis of varying extent, the radius of the orbital path, traversed by said aerial delivery device likewise varying as to the relative amount of centripetal force present.

The invention is illustrated in the accompanying drawings wherein:

Fig. 1 is a perspective view of the invention and Fig. 2 is a wiring diagram of the same.

Referring in detail thereto, the invention comprises a vertical standard 1, the base portion 5 of which rests within a base 7 having a vertically extending portion 6 to which is attached a journal 4.

Said standard 1 has reduced portions 2 and 3, the portion 2 supporting a cylindrical sleeve 28 to which is fastened an angularly disposed bracket 27. Said sleeve 28 is slidable upon a key 29 fitted within a keyway 30. Said bracket 27 supports a pair of companion pulleys 23 and 25 upon their respective trunnions 24 and 26.

On the upper part of the reduced portion 2 is mounted a bracket 15 by means of a pin 16, said bracket carrying a pulley 17.

The juncture of the reduced portion 2 and the standard 1 provides a spring seat for a spiral spring 32 upon which rests a copper disc 31.

The sliding action of the cylindrical part 28 upon the reduced portion 2 of the standard 1 permits the copper disc 31 to travel upwardly under the action of the spring 32 until it abuts with contact points 33 and 34, and later to retract under the weight of the sleeve 28, when it comes to a state of rest, at which instant the disruption of the current between contacts 33 and 34 takes place.

Upon the standard 1, intermediate of the journal 4 and the base 5, is mounted a bevel gear 13, by means of a pin 14. Said gear 13 is driven by means of a worm 11 mounted upon a shaft 10 of a motor 9 and supported by a foundation 8 carried by the base 7.

Said motor 9 when energized by a source of current through wires 47 and 48, produces a rotation of the standard 1.

In a convenient location with regard to the base 7 is a bracket 49 mounted upon the standard 1 by a pin 50. Said bracket carries a winch 51 having a pivot shaft 52 to which it is fixed, there also being mounted upon and fixed to said shaft 52 a ratchet 56 having an engaging pawl 57.

The base portion of arm 27 may be sufficiently cut away at 27b to enable it, when gyrated, to clear the upper portion 35b of bracket 35.

Said winch is operated manually by a crank 53 having a handle 54. About the winch 51 is wound a cable 18 which in turn is supported by pulleys 17 and 25.

Upon the end of the cable is fastened a hook member 19 having a hook 20 which supports the delivery article 22 by means of a detachable link 21, which may be a cuttable cord.

Said delivery article is supplied with a plurality of streamers 22a which, during the rotation of the article, are free to fly outwardly therefrom and which afford a means of grasp to first trail the delivery article before the article is removed from its supporting cable, by the aviator's assistant 59.

Upon the reduced portion 3 of the standard 1 is mounted a bracket 61 by means of a pin 62, said bracket having a projecting arm 61a which supports a light 60 whose rays are always directed upon the delivery article while traversing its orbital path.

On the top of the standard 1, as a means for lighting the station so it can be seen from afar, is a light 64, whose rays are outwardly directed therefrom and down upon the reflector 63.

The vertically extending portion 6 of the base 7 carries, at its upper extremity, a bracket 35 having a laterally disposed portion 35b limiting the upward travel of the disc 31. On the underside of said portion 35b is mounted contact points 33 and 34 to which are fastened electric conducting wires 36 and 37, wire 36 leading to a switch 44.

To said wires 36 and 37 are connected wires 38 and 39, the latter terminating at a push button switch 40.

The switch 44 is a single pole knife switch inter-connectable at 43 and 46 by poles carried by a bracket 42. Said switch 44 is provided with a handle 45. Wires 47 and 48 are electric feed wires.

The nomenclature of the parts of the wiring diagram in Fig. 2 will now be briefly reviewed.

31 is the metallic contact disc which follows the upward movement of the slidable member 28 of Fig. 1.

When the motor 9 is put into operation, thus rotating standard 1 together with the parts carried thereby, the centrifugal force of the bag 22 attached to the cable 18 produces a component force on the under side of the pulley 23 causing the slidable member 28 to move upwardly thus allowing the metallic circuit closing device to also move upwardly, under the action of the spring 32, until it bears upon contact points 33 and 34.

38 and 39 are the wires to the single pole push button switch 40 which is similar to an electric bell switch but is of heavy duty design.

47 and 48 are wires of the feed lines, and 9a is the commutator rotatable upon shaft 10. 44 is a single pole knife switch or the like to start the motor. The push button switch 40 makes possible the starting of the motor when the bag is detached and no current can pass between the contacts 33 and 34.

40a and 40b are the contacts proper of the push button switch 40. Wires 36 and 37 form the sub-circuit thru the metallic disc 31. The main circuit consists of wire 47 through switch 44, wire 39, contacts 40a and 40b, wires 48 and 37 to the motor, together with the main lead 48.

Closing switches 44 and 40 starts the motor. As soon as the motor rotates the shaft 1 with sufficient rapidity to produce centrifugal force in the bag, this causes cable 18 to elevate the pulley 23, and the copper disc 31 automatically cuts in the sub-circuit. Consequently the mail bag will continue to travel until it is either detached or the switch 44 is opened. When the bag 22 is detached the weight of the member 28 causes said member to gravitate downwardly disrupting the current between contacts 33 and 34 and automatically stopping the motor.

The object of providing the contacts 33 and 34 which cooperate with the disc 31 to make and break the circuit through the motor is to adapt the device for continuous operation after the operator has closed the switch 40 for a short time. Doing this will generate an amount of speed of rotation of the standard 1, together with the parts carried thereby, sufficient to maintain the circuit closed by reason of the elevated position of the disc 31 at this time, for the reasons already described, until the aviator has removed the bag 22 from the hook 20.

It will be observed that the apparatus is so constructed that it is adapted to cause the bag to travel along so large an orbit that the aviator can deflect the path of the aeroplane sufficiently to cause it to travel along substantially the same path as the bag for a sufficient distance to enable his assistant to detach the bag.

Winch 51 is adapted to regulate the height of the hook 20 in order that said hook may be lowered sufficiently for convenient attachment of the bag 22, after which the cable 18 may be wound upon said winch sufficiently to bring the bag up to the height at which it is desired to support it during the orbital movement thereof. The combination of the winch 51 and cable 18 together with the cooperating parts, is particularly valuable when, as may be desirable, the apparatus is located upon the top of a tower (not shown) and it be found desirable to use the winch to elevate the mail bag from a point adjacent the base of such tower.

Claims:

1. A delivery apparatus adapted to deliver articles to aeroplanes while in flight comprising a support adapted to support detachably and in an elevated position a moving article to be delivered, and means to rotate said support to cause said article to move in an orbital path accessible to an aeroplane while in flight.

2. A delivery apparatus adapted to deliver articles to aeroplanes while in flight comprising a support adapted to support detachably and in an elevated position an article to be delivered, a flexible connection whereby such article is secured to said support, and means to rotate said support to cause said article together with its flexible connection to move outwardly from said support under the action of centrifugal force and then through a path accessible to an aeroplane while in flight.

3. A delivery apparatus adapted to deliver articles to aeroplanes while in flight comprising a support adapted to support detachably and in an elevated position an article to be delivered, a cable and a hook whereby such article is secured to said support, and means to rotate said support to cause said article together with its supporting cable to move outwardly from said support under the action of centrifugal force and then through a path accessible to an aeroplane while in flight.

4. In an article delivery apparatus adapted to deliver articles to aeroplanes while in flight, an upright shaft, electrically driven means to rotate said shaft, a member slidably mounted on said shaft to rotate therewith, said member having a laterally disposed arm, a radially extensible cable supported by said arm, an article delivery means secured to said cable, said arm being constructed and arranged to move upwardly under the action of said cable when said shaft and arm are rotated, a switch to control said electrically driven means, a contact plate movable by said arm to close said switch, and yieldable means acting on said contact plate, said arm and plate tending by gravity to open said switch against the opposition of said yielding means upon the delivery of said article.

5. In an article delivery apparatus adapted to deliver articles to aeroplanes while in flight, an upright shaft, electrically driven means to rotate said shaft, a member slidably mounted on said shaft to rotate therewith, said member having a laterally disposed arm, a radially extensible cable supported by said arm, an article delivery means secured to said cable, a switch to control said electrically driven means, means whereby the lifting of said arm by said cable closes said switch, the aforementioned electric means including a sub-circuit and a motor to rotate said upright shaft; and a manually operable switch to temporarily close said sub-circuit till the first mentioned switch is automatically closed as aforesaid.

6. In an article delivery apparatus adapted to deliver articles to aeroplanes while in flight, a support; an electric motor operatively connected with said support to rotate it in a substantially horizontal plane; a vertically slidable member mounted upon said support in circumferentially fixed relation thereto; an electric circuit-making means for said motor, said circuit-making means including a main circuit controlled by a switch automatically operated by said vertically slidable member, and a sub-circuit having a manually operable switch through which current is supplied to said motor to start the same and run it only until said automatic switch closes, said vertically slidable member being operable by centrifugal force to close said automatically operable switch.

7. In an aerial mail delivery, a rotatable tower, said tower having a lateral extension, a cable extending up from the base portion of said tower to and along said extension and having beyond said extension an end portion adapted to have the article to be delivered detachably secured thereto, means to rotate said tower at a speed sufficient to cause the terminal portion of said cable together with an article attached thereto to travel along an orbital path radially beyond the outer end of said extension, and means to control the operation of the last recited means.

8. In an aerial mail delivery, a rotatable tower, said tower having a lateral extension, a cable supported by said extension and having a terminal portion extending radially therebeyond, means to extend and to retract said cable, means to rotate said tower at a speed sufficient to cause the terminal portion of said cable together with an article attached thereto to travel along an orbital path radially beyond the outer end of said extension, and means to control the operation of the last recited means.

9. In an aerial mail delivery, a rotatable tower, said tower having a lateral extension, a cable supported by said extension and having a terminal portion extending radially therebeyond, a winch carried by said tower to retract and extend said cable, means to rotate said tower at a speed sufficient to cause the terminal portion of said cable together with an article attached thereto to travel along an orbital path radially beyond the outer end of said extension, and means to control the operation of the last recited means.

10. In an aerial mail delivery, a support; a motor operatively connected with said support to rotate it in a substantially horizontal plane; a vertically slidable member mounted upon said support in circumferentially fixed relation thereto; a cable having a connection with said support at a point above said vertically slidable member, a portion of said cable extending radially from said point and being sustained by said vertically slidable member and, in turn, being positioned to raise said member under the influence of centrifugal force; means to detachably secure an article to be delivered to said radially extending portion of said cable, and means operable by the rise and fall of said vertically slidable member to control the operation of said motor.

11. In an aerial delivery device, means to cause an article to be delivered to traverse a predetermined orbital path against the action of gravity, and means connected to said article whereby the same may be grasped by an aviator and trailed in said path prior to the detachment of said article from said device.

12. In an aerial delivery device, means to cause an article to be delivered to traverse an orbital path against the action of gravity, means connected to said article whereby the same may be caught by an aviator and trailed in said path prior to the detachment of said article from said device, said means comprising a plurality of streamers and being waftable.

13. In an aerial delivery device adapted to deliver articles to navigable aircraft, comprising a standard, a bracket rotatable about the axis of said standard, an article of delivery operatively related to said standard and bracket, and means to rotate said standard to cause said article to traverse an orbital path and simultaneously effect a movement of said bracket along the axis of said standard.

14. In an aerial delivery device adapted to deliver articles to navigable aircraft, comprising a standard, a bracket rotatable about the axis of said standard, an article of delivery operatively related to said standard and bracket, means to rotate said standard to cause said article to traverse an orbital path and simultaneously effect a movement of said bracket along the axis of said standard, a switch operatively related to said standard and means to close said switch when said bracket is moved to unconstraining position on said standard.

15. In an aerial delivery device adapted to deliver articles to navigable aircraft, comprising a standard, a bracket rotatable about the axis of said standard, an article of delivery operatively related to said standard and bracket, means to rotate said standard to cause said article to traverse an orbital path and simultaneously effect a movement of said bracket along the axis of said standard, a switch operatively related to said standard and bracket and means to close said switch when said bracket is moved to unconstraining position on said standard by the centrifugal force of said article.

16. In an aerial delivery device, means to cause an article to be delivered to traverse an orbital path against the action of gravity, means waftable whereby said article is adapted to be manually trailed and grasped by an aviator from his craft prior to the detachment of said article from said device, a switch adapted to be closed when the rotation of said article attains a certain speed and which is adapted to be automatically opened as soon as the article is detached from said device.

17. In an aerial delivery device, means to cause an article to be delivered to traverse an orbital path, and means comprising a plurality of streamers connected to said article adapted to be manually caught by an aviator from his craft, whereby the article may be trailed prior to its detachment from said device, said article being detachable and its connection being also cuttable.

18. In an aerial delivery device, means to move an article to be delivered in an orbital path accessible to pick up by an aviator in his flight and means waftable by the air connected to said article whereby the same may be caught by said aviator, diverted from its path and manually detached from said device.

19. In an aerial delivery device, means to support and rotate an article in a path accessible to manual pick up by an aviator in his flight and means to effect a cessation of the rotation of the means supporting said article after said article is detached from said device.

ROY FISHER.